Feb. 7, 1933.  E. M. BERTRÁN  1,896,999
AIRCRAFT CONTROL MEANS
Filed Feb. 12, 1932  3 Sheets-Sheet 1

Edward M Bertrán
INVENTOR.

BY Bernard F. Garvey
ATTORNEY.

Feb. 7, 1933. E. M. BERTRÁN 1,896,999
AIRCRAFT CONTROL MEANS
Filed Feb. 12, 1932  3 Sheets-Sheet 2

Edward M Bertrán
INVENTOR.

BY Bernard F. Garvey
ATTORNEY.

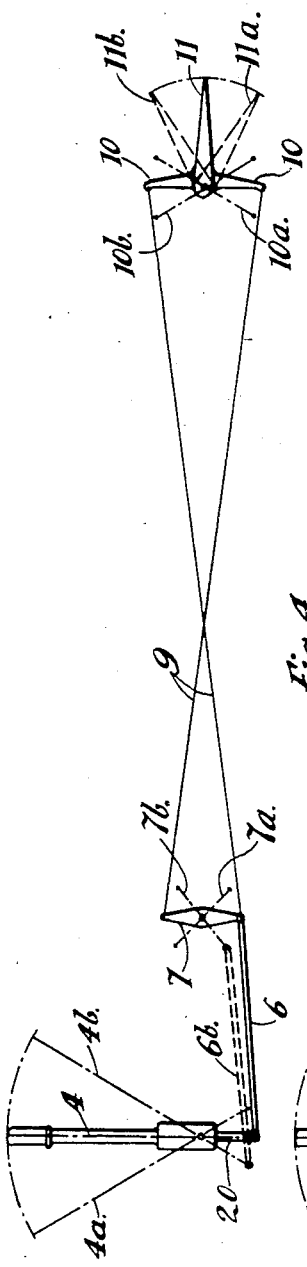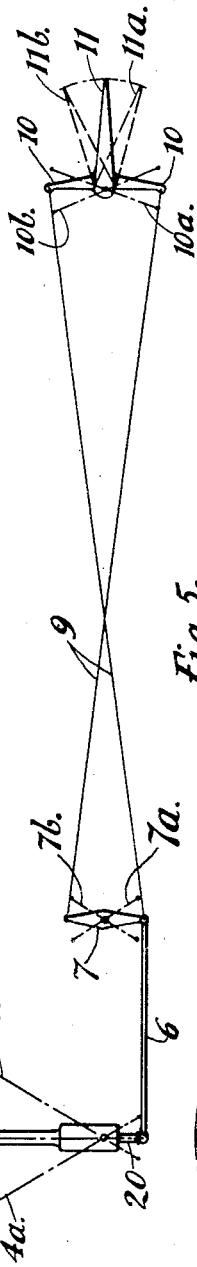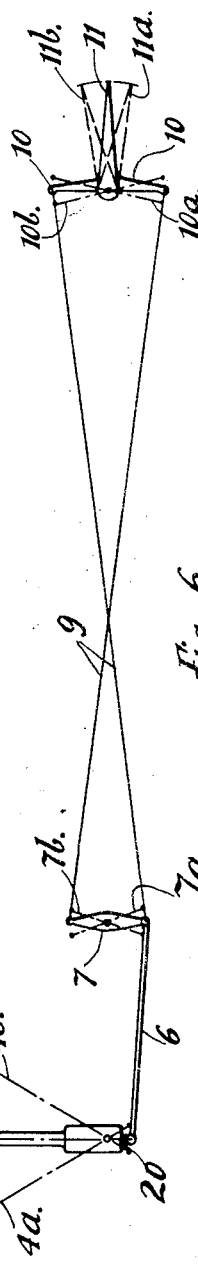

Patented Feb. 7, 1933

1,896,999

UNITED STATES PATENT OFFICE

EDWARD M. BERTRÁN, OF BALTIMORE, MARYLAND, ASSIGNOR TO CHAS. M. STIEFF, INC., OF BALTIMORE, MARYLAND, A CORPORATION

AIRCRAFT CONTROL MEANS

Application filed February 12, 1932. Serial No. 592,606.

My present invention relates to a device for preventing excessive loads from being applied to airplane structures, and having for an object to prevent failures of aircraft due to the application of air loads in excess of the strength of the structure.

It is well known that the load that can be imposed on an airplane structure by the action of the air is in direct ratio to the second power of, the ratio of the speed of the airplane to its possible minimum speed in level flight. This is the theoretical physical maximum which may be brought about by the sudden change of the attitude or angle of incidence of the airplane corresponding to variations in velocity of travel. The speed with which a change of attitude of an airplane can be brought about is dependent on the effectiveness of the control surfaces, and determines the load imposed by the air on the structure of the airplane. Consequently the air loads imposed on an airplane are dependent on the effectiveness of the control surfaces.

It is possible that other factors, such as the presence of gusts in the wind can bring about air loads on airplane structures when in flight, but it has been found by experience that these loads are not as severe as those imposed by intentional maneuvers. Hence, a coordinate object of the present invention is to equip the control means with adjuncts automatically operated to progressively decrease the load imposition on the airplane, when intentionally maneuvering the latter by operation of the controls.

One of the methods of application of the invention is shown, by way of illustration and not of limitation, in the accompanying drawings, in which Fig. 1 is a side elevational view of an airplane embodying air controlled means constructed in accordance with the present invention, a part thereof being broken away to disclose details;

Fig. 4 is a side elevational view of control mechanism, showing the position of the control stick and associated mechanism when the aircraft is travelling at a low rate of speed, dotted lines being used to show the extent of throw of the elevator when the aircraft is travelling at a low speed;

Figure 1:
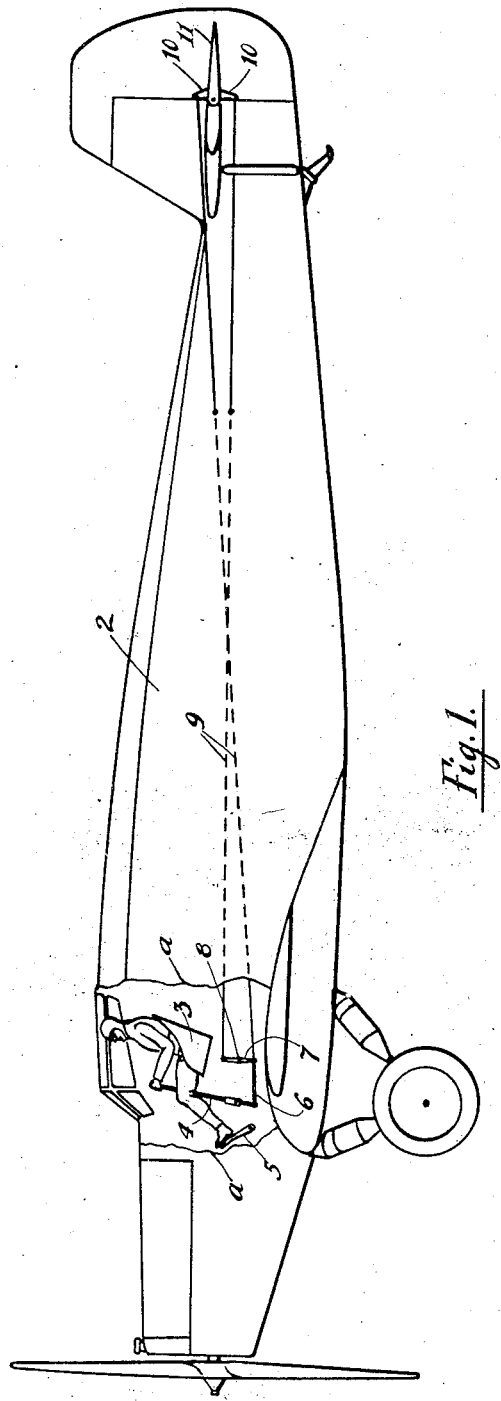

Fig. 5 is a similar view, showing the position of the stick when the aircraft is travelling at a high rate of speed, dotted lines being used to indicate the extent of throw of the elevator when the stick is in this position; and Fig. 6 is a similar view, showing the positon of the control stick when the aircraft is travelling at a very high rate of speed, dotted lines being used to show the extent of throw of the elevator when the aircraft is travelling at this speed.

In the drawings the stick 4 is shown as provided at the top with a handle 12, while the lower end is mounted in a cylinder 13. Trunnions 14 are carried by the cylinder and project from the latter, in the present form of the invention, below the horizontal axis of the cylinder. Near the top of the cylinder I provide a vent hole 15 for a purpose hereinafter described. One end of the cylinder is open and equipped with a detachable cover 16. A tube 17 depends from the cover 16 and communicates with the cylinder 13. A flexible tube 18 joins the tube 17 to a tube 19, which latter is fastened to a fixed part of the airplane. The free end of the tube 19 is exposed to the outside air in the direction of motion or flight A. Ingress of air to the cylinder is thereby permitted through the tube 19.

One end of a shaft 20 projects through an opening in the cover 16, and is in pivotal engagement with one end of the rod 6, as shown in Fig. 1. The shaft 20 is connected at its upper end to a piston 21, by means of a nut 22. The assembly of members 20, 21 and 22 can slide along the direction of the length of the control stick. The piston is normally urged to the bottom of the cylinder 13 by a spring 23, compressed between the piston 21, and a block 24, which latter is fastened to the stick 4 by a pin 25.

In Figs. 4, 5 and 6 there are shown the relative positions of the control stick and elevator when the movable piston and shaft, 21 and 20 respectively, are in different positions relatively to the cylinder 13. Fig. 4 represents the relative positions when the piston and rod, 21 and 20, are in their lowest position. Fig. 5 represents the relative positions when the piston and rod, 21 and 20, are in the median position. Fig. 6 represents the relative positions when the piston and rod, 21 and 20, are in their highest position. The numeral 4a indicates the foremost position of the control stick 4, and 7a, 10a, and 11a, respectively, show the corresponding positions of elements 7, 10 and 11. The numeral 4b indicates the rearmost position of 4, and 7b, 10b and 11b, respectively, show the corresponding positions of items 7, 10 and 11. In addition, Fig. 4 shows, at 6b, the position of rod 6 corresponding to 4b and 7b.

Figure 2:
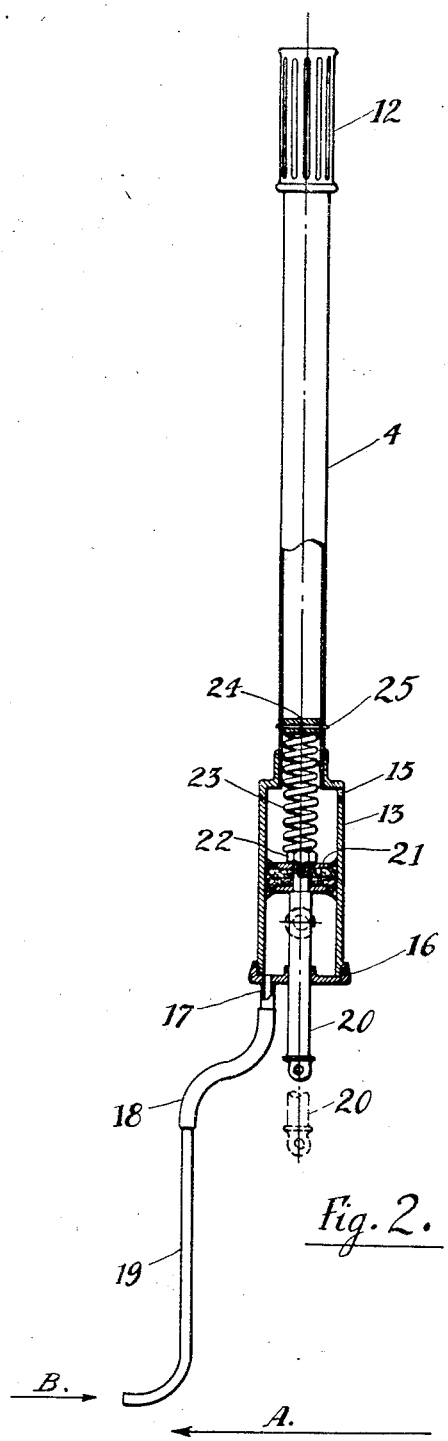
Fig. 2 is a side elevational view of a control stick with an attachment embodying a form of my improved control means.
Figure 3:
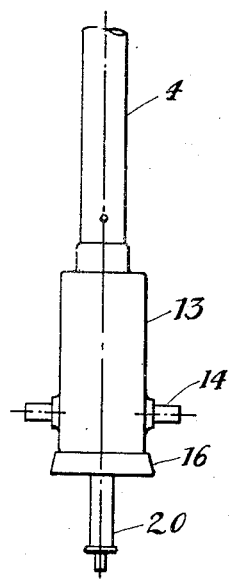
Fig. 3 is a detail fragmentary rear elevational view of a control stick showing my improvement mounted thereon.

In Fig. 1 the pilot controls the vertical longitudinal motion of the airplane by angular movements of the control stick 4, which through the rod 6, are transmitted to the lever 7, and this in turn through the wires 9, transmits these angular movements to the elevator 11. When the position of the elevator is changed, the attitude or angle of attack of the airplane and the wings, are correspondingly changed, and, as the speed is not immediately affected and the load applied to the wings varies with their angle of attack, the load applied to the wings and the necessary reaction of any item of the airplane is correspondingly changed. The changes above described will not last indefinitely, but only until such time as a new position of equilibrium for straight flight will be found. Referring now to Fig. 2, when my invention is in operation in a control system, in an airplane flying at low speed, the spring 23, being initially compressed, pushes the piston 21 and the shaft 20 to their lowest position, as shown in dotted lines.

The airplane moves in the direction shown by the arrow A, and consequently the motion of the air relative to the airplane is shown by arrow B. The kinetic energy of the air blowing against the opening of the tube 19, builds up a pressure into cylinder 13, and tends to push the piston 21 and the shaft 20 to a higher position, but such action is normally resisted by the spring 23. The tube 18, connecting tubes 17 and 19, is made flexible in order to allow the stick control and all its components rigidly fastened to it, including tube 17, to swing about the trunnions 14 without disturbing the permanent position of tube 19, nor the pneumatic connection between tubes 17 and 19. The vent hole 15 provided at the top of cylinder 13, is for the purpose of preventing air pressure from building up back of the piston 21. Referring to Fig. 4, the relative position of the control stick 4, the lever 7, the elevator control horns 10 and the elevator 11 are shown respectively by numbers 4a, 7a, 10a and 11a when the control stick is moved to its most forward position, and by numbers 4b, 7b, 10b and 11b, when the control stick is in its most rearward position. Referring back to Fig. 2 it will be seen that as the speed increases the kinetic energy of the air due to its motion relatively to the airplane will increase. At a predetermined speed, here referred to as high, the pressure on the lower surface of the piston 21 will be sufficient to move the piston 21 and shaft 20 from its lowest position to its median position against the resistance of the spring 23. If the speed of the airplane is further increased to what we shall call very high, the pressure on the bottom of the piston 21, shall be further increased, due to the increased kinetic energy of the air. This causes the piston 21 and shaft 20 to be moved to their highest position.

Referring now to the consequences of these movements on the control system, we find on Fig. 5 that at high speed with the rod 20 in its median position, when the control stick 4, is moved to its extreme position 4a and 4b, the lever 7, the elevator horns 10 and the elevator 11 move to the extent indicated at 7a, 10a, 11a and 7b, 10b, 11b. Considering the airplane flying at very high speed, and Fig. 6, when the shaft 20 is at its highest position and the control stick 4 is moved to 4a and 4b, then 7, 10 and 11 are respectively moved to 7a, 10a, 11a, and 7b, 10b, 11b, respectively. Comparing now Figs. 4, 5 and 6, we see that for a similar movement of the control stick 4 at low, high and very high speeds the movement of the elevator 11 corresponds in inverse order. As the loads imposed by the air on airplane structures are dependent on the speed and on the control surface effectiveness, these two factors are made to vary in inverse directions, in the present invention. The control unit automatically contracts as the rate of travel of the airplane increases and hence, the control effective at higher speeds is less. The air loads imposed by operating the control of an airplane equipped with my present invention are thereby reduced to a minimum.

By the proper proportioning of the different elements involved in a mechanism constructed in accordance with the teaching of the present invention, the possible maximum air loads can manifestly be brought within the range of the strength of an airplane structure.

My invention has been explained in detail only as applied to the elevator control of an airplane, but as the control of the rudder, ailerons, and any control surface is similar, it is evident that the application of this invention and the results thereof will be similar.

What is claimed is:

1. In an airplane including control mechanism, and means forming a part of said mechanism and automatically variable in harmony with changing speeds of the airplane to vary the effectiveness of the control mechanism when said means is operated.

2. An air plane control mechanism including an elevator and control stick in operative connection therewith; and means embodied in the stick to automatically shorten the operating lengths of the latter as the speed of the airplane increases.

3. In combination with an aircraft including an elevator with a control stick operatively connected thereto; and pneumatic means included in the stick to contract the operating length of the latter as the rate of travel of the aircraft increases, for correspondingly decreasing the extent of movement of the elevator when the stick is operated.

EDWARD M. BERTRÁN.